United States Patent [19]
Doshi

[11] Patent Number: 4,690,695
[45] Date of Patent: Sep. 1, 1987

[54] ENHANCED GAS SEPARATION PROCESS
[75] Inventor: Kishore J. Doshi, Mahopac, N.Y.
[73] Assignee: Union Carbide Corporation, Danbury, Conn.
[21] Appl. No.: 850,045
[22] Filed: Apr. 10, 1986
[51] Int. Cl.⁴ .................. B01D 53/04; B01D 53/22
[52] U.S. Cl. .................. 55/16; 55/26; 55/62; 55/68
[58] Field of Search .............. 55/16, 25, 26, 62, 68

[56] References Cited
U.S. PATENT DOCUMENTS

| | | | |
|---|---|---|---|
| 3,324,626 | 6/1967 | Dresser et al. | 55/16 |
| 3,336,730 | 8/1967 | McBride et al. | 55/16 |
| 3,430,418 | 3/1969 | Wagner | 55/62 X |
| 3,595,805 | 7/1971 | Cohn et al. | 55/16 X |
| 3,738,087 | 6/1973 | McCombs | 55/58 |
| 3,986,849 | 10/1976 | Fuderer et al. | 55/25 |
| 4,119,417 | 10/1978 | Heki et al. | 55/16 X |
| 4,229,188 | 10/1980 | Intille | 55/16 |
| 4,238,204 | 12/1980 | Perry | 55/16 |
| 4,264,338 | 4/1981 | Null | 55/16 |
| 4,398,926 | 8/1983 | Doshi | 55/16 |
| 4,548,619 | 10/1985 | Steacy | 55/16 |

Primary Examiner—Robert Spitzer
Attorney, Agent, or Firm—M. N. Reinisch

[57] ABSTRACT

A feed gas stream is separated by the use of one or more permeable membranes for bulk separation and for residual product gas recovery, in combination with a pressure swing adsorption process for the recovery of high purity product gas, e.g., hydrogen from mixtures thereof with methane. Waste gas from the PSA system is passed to one or more of such permeable membranes for enhanced product recovery, the recovery levels achieved being advantageously reconciled with the corresponding compression and other cost factors pertaining to the overall process for the production of such high purity product gas.

30 Claims, 3 Drawing Figures

ENHANCED GAS SEPARATION PROCESS

BACKGROUND OF THE INVENTION

1. Field of the Invention

The invention relates to the separation of gases. More particularly, it relates to the enhancing of the recovery of high purity product in such gas separation operations.

2. Description of the Prior Art

Permeable membranes capable of selectively permeating one component of a gas mixture have been considered as a convenient, potentially highly desirable means for achieving gas separations. The use of such membranes depends, to a considerable extent, on the differential pressures maintained on opposite sides thereof, with the passage of the more permeable component through the membrane being enhanced as the pressure differential across the membrane is increased. Such pressure differential is limited, however, by practical operating considerations, such as the strength of the membrane itself, compression costs applicable to such separations, and the like. Because of such factors, the purity and product recovery associated with the use of a permeable membrane tends to be limited to the upgrading of relatively high quality gas streams.

For gas separation operations in which a single stage membrane system is not capable of achieving the normal product purity levels desired in the art, two-stage permeable membrane systems have been proposed, wherein the concentration of the product gas is improved by passing the permeate first stage membrane to an additional membrane stage to improve the purity of the desired product gas. Thus, the Null patent, U.S. Pat. No. 4,264,338, illustrates a two-stage membrane system, with an inter-stage compressor, but indicates that even such a system is not capable of providing the normal purity product commonly desired in the art. It was also pointed out by Null that the use of additional membrane stages, in a so-called gas separation cascade, would severely increase operating costs and compressor, membrane and related equipment costs. In many instances, therefore, the costs needed to achieve a normal purity product gas were said by Null to increase beyond the point of economic feasibility. As a result, despite the recognized convenience and other advantages pertaining to the membrane approach, permeable membranes were not employed for many practical commercial gas separation operations.

In an effort to overcome such a restriction concerning the practical use of membranes, Null proposed a three-stage membrane system in which the non-permeate gas from the second of two membranes employed in series, with inter-stage compressor, is passed at elevated pressure to a third stage, or recycle stage, membrane. The permeate recovered from this stage is blended with the first stage permeate prior to the recompression thereof by the in-line, inter-stage compressor, and the passage of such compressed gas to the second stage membrane. In this approach, the non-permeate gas from the third stage membrane, available at elevated pressure, is blended with additional quantities of the feed gas mixture for recycle to the first stage membrane. The non-permeate gas from said first stage membranes is the only waste gas removed from the system, while the desired normal purity product gas comprises the permeate gas recovered at reduced pressure from the second stage membrane.

The Null approach employing a recycle membrane stage can be used in some embodiments to produce a normal purity gas, i.e., about 95–97% purity in the case of hydrogen or helium purification, not previously obtainable in practical commercial operations by the use of permeable membranes for gas separation. It will be appreciated that the recycle membrane is of value in this regard only when the permeation pressures and other factors are such as to enable the recycle membrane to more effectively separate the desired permeate portion of the gas mixture recycled from the second stage membrane than is accomplished in said first stage itself. A greater driving force across the recycle membrane is required for this purpose. Thus, a balancing of membrane and compression costs is necessarily involved in this approach, as in other approaches to the use of permeable membranes for gas separation.

While membranes can be conveniently employed for the upgrading of low quality gas streams, and can be used effectively to produce the normal purity product referred to above by use of the Null multi-stage approach, membranes have not been effectively employed to separate a high purity product at desirably high recovery levels. A high purity product, for purposes hereof and as known in the art, typically comprises a product gas having a purity of from about 98% to about 99.9+ mol % in the case of hydrogen or helium purification. Thus, the three stage system of Null is not adapted for the production of such high purity gas, and, as noted above, the use of additional membrane stages to achieve high purity levels is not feasible because of the prohibitive costs associated with such additional staging. There remains a desire in the art, therefore, for a gas separation process utilizing the convenience of permeable membranes while producing high purity product gas at desirable recovery levels.

It is an object of the invention, therefore, to provide an improved gas separation process utilizing the convenience of permeable membranes.

It is another object of the invention to provide a gas separation process utilizing permeable membranes, but also capable of recovering high purity product gas at desirable recovery levels.

With these and other objects in mind, the invention is hereinafter described in detail, the novel features thereof being particularly pointed out in the appended claims.

SUMMARY OF THE INVENTION

The invention employs a permeable membrane or membrane stages for initial bulk gas separation, with the permeate gas therefrom being passed to a pressure swing adsorption (PSA) system for the separation and recovery of a high purity product gas. The PSA waste gas is compressed and blended with the feed gas for passage to said membrane, from which non-permeate gas is withdrawn at said elevated pressure. In processing variations, said non-permeate gas and/or said PSA waste stream can be passed to additional membrane stages for enhanced recovery purposes, with a product gas being recovered at high purity from the PSA system in each instance.

BRIEF DESCRIPTION OF THE INVENTION

The invention is further described with reference to the accompanying drawings in which.

DETAILED DESCRIPTION OF THE INVENTION

The objects of the invention are achieved by utilizing permeable membranes as referred to above, in one or more stages, together with a PSA system in an integrated process adapted for the advantageous recovery of the desired product gas at high purity. The advantageous features of such permeable membranes and of PSA systems are both utilized in the practice of the invention to enhance the desired recovery of high purity gas. The non permeate gas is recovered at a desirably high pressure level.

The PSA process is, of course, of itself a well known means for separating and purifying a less readily adsorbable gas component contained in a feed gas mixture of said component with a more readily adsorbable second component, considered as an impurity or otherwise. Adsorption commonly occurs in such beds at an upper adsorption pressure, with the more selectively adsorbable second component thereafter being desorbed by pressure reduction to a lower desorption pressure. The beds may also be purged, typically at such lower pressure for further desorption and removal therefrom of said second component, i.e., the removal of impurities with respect to the desired product gas, before repressurization of the beds to the upper adsorption pressure for the selective adsorption of said second component from additional quantities of the feed gas mixture as the processing sequence is carried out, on a cyclic basis, in each bed in the PSA system. Such PSA processing is disclosed in the Wagner patent, U.S. Pat. No. 3,430,418, and in the Fuderer et al patent, U.S. Pat. No. 3,986,849, wherein cycles based on the use of multi-bed systems are described in detail. Such cycles are commonly based on the release of void space gas from the product end of each bed, in so-called cocurrent depressurization step(s), upon completion of the adsorption step, with the released gas typically being employed for pressure equalization and for provide purge gas purposes. The bed is thereafter countercurrently depressurized and/or purged to desorb the more selectively adsorbed component of the gas mixture from the adsorbent and to remove such gas from the feed end of the bed prior to the repressurization thereof to the adsorption pressure.

The use of permeable membranes in conjunction with PSA systems has heretofore been disclosed with respect to the separation and recovery of a product gas, such as hydrogen, from a feed gas stream available at a high pressure, e.g., in excess of about 600 psig, and containing a high concentration of impurities. Thus, the Doshi patent, U.S. Pat. No. 4,398,926, provides for the passage of such a feed gas stream to a permeable membrane to achieve bulk separation of impurities from the high pressure feed gas stream, with passage of the product-rich permeate gas to the PSA system at reduced pressure for final purification. To increase product recovery in the PSA system, a portion of the non-permeate gas from the permeable membrane is depressurized to the permeate pressure level, i.e. the adsorption pressure level, and is passed to the PSA system as a co-feed gas, at said pressure level, to each adsorbent bed therein in turn prior to commencing cocurrent depressurization in that bed and subsequent depressurization to a lower desorption pressure to desorb and release impurities in the waste gas stream removed from the feed end of the bed. Those skilled in the art will appreciate that the impurities released from the feed end of the bed during the countercurrent depressurization and/or purge steps of the PSA portion of the Doshi process constitute a waste removal stream for the overall membrane—PSA gas separation operation described therein, the only such removal means if all of the non-permeate gas from the membrane stage is passed to the PSA system. It should be noted, however, that the passage of a portion of the non-permeate gas from one or more of the permeable membranes used in the practice of the invention can be passed to the PSA system in the manner disclosed in the Doshi patent, although it will be appreciated that, contrary to the Doshi process, the non-permeate gas withdrawn from the system in the practice of the invention constitutes the only essential by-product or impurity gas removal means for the process.

Figure 1:
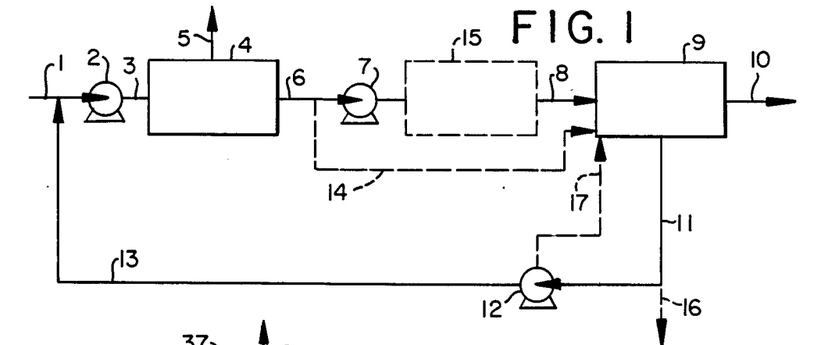
FIG. 1 is a schematic drawing showing an embodiment of the gas separation process of the invention employing an integrated permeable membrane and pressure swing adsorption system.

With reference to FIG. 1 of the drawing, a feed gas stream to be separated is passed in line 1 to feed compressor 2, if required, for compression to the elevated pressure desired for initial permeable membrane separation. The compressed feed gas is passed in line 3 to permeable membrane system 4 capable of selectively permeating a first component of the initial feed gas mixture. The non-permeate portion of the feed gas stream, i.e., the second component enriched, first component depleted gas that does not pass through the permeable membrane, is withdrawn from membrane system 4 through line 5 essentially at the elevated pressure level at which the feed gas stream is passed to said membrane system 4. This non-permeate gas in line 5 will be seen to constitute the only necessary waste stream removed from the overall system of the invention. While the stream in line 5 may be considered as a waste stream, it will be understood that this stream, constituting a second component enriched, first component depleted non-permeate gas, may itself be a desirable product stream, depending upon the particular gas separation being carried out and the products desired. In addition, the recovery of the non-permeate stream essentially at the elevated pressure level of the feed gas stream is, of itself, desirable, as for power generation purposes. By contrast, the countercurrent depressurization and/or purge waste stream containing the desorbed impurities of the Doshi process are removed from the adsorbent beds of the PSA system at generally much lower pressure levels, i.e., at the relatively low desorption pressure level employed. Such desorption pressure will commonly be at or near atmospheric pressure.

The first component enriched, second component depleted permeate portion of the feed gas stream is obtained at a reduced pressure and is passed, essentially at that pressure level, in line 6 to an in-line, inter-stage compressor means 7, if desired, to increase the pressure of said permeate gas to the desired upper adsorption pressure level desired for operation of the pressure swing adsorption process in which the permeate gas resulting from bulk separation in membrane system 4 is to be subjected to final purification to produce the desired high purity product. The compressed permeate gas is passed from compressor 7 in line 8 to PSA system 9 capable of selectively adsorbing additional amounts of said second component, such as to produce a desired high purity product. As those skilled in the PSA art will appreciate, the selective adsorption of said second component will cause an impurity front of said second component to form in the bed or beds of PSA system 9 undergoing the adsorption step, said front being essentially the leading edge of the region beginning at the feed end of the bed in which the adsorbent becomes saturated with said second component being selectively adsorbed. This impurity front will advance through the bed in the direction of the product end of the bed as additional quantities of the permeate gas are passed to the feed end of the bed. Unadsorbed, purified first component gas is withdrawn as high purity product gas from the product end of the bed and from the PSA system through line 10. It will be appreciated that said product gas is obtained essentially at the adsorption pressure level at which permeate gas is passed through line 8 to PSA system 9.

In the practice of the invention and in typical PSA processing operations carried out in systems having more than one adsorbent bed, as in the Wagner and the Fuderer et al patents referred to above, feed gas is typically passed, in turn, to each adsorbent bed at the desired upper adsorption pressure, for the selective adsorption of the more readily adsorbable component, i.e., the second component in this case, and removal of the less readily adsorbable component, i.e., the first component to be purified, from the product end of the bed. This step is commonly referred to as the adsorption step, and is followed by one or more cocurrent depressurization steps in which void space gas present in the bed at the end of the adsorption step is released from the product end of the bed. The bed is thereby cocurrently depressurized from the adsorption pressure level to a lower intermediate pressure level or levels. The adsorption front is caused to move further toward the product end of the bed during such step(s) by the additional selective adsorption of the more readily adsorbable second component. In the practice of the invention, as in conventional PSA practice, the void space gas released from the product end of the bed during cocurrent depressurization is typically passed, directly or indirectly, to another bed initially at a lower pressure for pressure equalization purposes and/or to another bed being desorbed or having been desorbed for providing purge gas purposes, depending upon the particular PSA system and cycle being employed in any particular application.

Following such adsorption and cocurrent depressurization steps, each bed in the PSA system is, in turn, countercurrently depressurized to a lower desorption pressure and/or is purged to desorb and release from the feed end of the bed what, in conventional PSA practice and in the Doshi process referred to above, constitutes a waste stream comprising the impurities removed from the product gas being purified. In the practice of the invention, however, the countercurrent depressurization and/or purge gas effluent comprises a first and second component—containing regeneration stream that is withdrawn from PSA system 9 in line 11 and is recompressed from said lower desorption pressure to a higher pressure in compressor means 12 from which it is recycled in line 13 for combining with additional quantities of the feed gas stream passing in line 1 for compression to the elevated permeation pressure and passage to said permeable membrane system 4.

In the practice of the FIG. 1 embodiment of the invention, the desired separation of the first component of the feed gas stream is achieved at a high purity level not achievable in practical commercial embodiments of the wholly membrane approach, including that of the Null patent in which ordinary product purity levels can be obtained at desirable recovery levels similar to those obtainable in the practice of the invention.

In the FIG. 1 embodiment of the invention, the use of in-line, inter-stage compressor means 7 enables membrane system 4 to be operated at an advantageously high pressure drop across the permeable membrane, thereby enhancing the bulk separation operation achieved in said membrane system 4. Compressor means 7 is then used to repressurize the permeate gas recovered at a relatively low pressure from membrane system 4 to the upper adsorption pressure level desired for the operation of PSA system 9. It will be appreciated that, in practice, such an embodiment has the advantage of an efficient utilization of the permeable membrane for an advantageous initial bulk gas separation, which serves to enhance the recovery of the desired product gas, i.e., the first component of said feed gas stream. A necessary trade-off accompanying such efficient use of membrane system 4 is the power requirements associated with the use of compressor means 7. In addition the use of such an in-line, inter-stage compressor, as in the Null wholly membrane approach, necessarily results in an additional operating factor affecting the reliability of the overall system. Thus, a failure or defect in compressor means 7 requires that the operating line be interrupted for the repair or replacement of the compressor. While the embodiment of FIG. 1 thus provides a highly desirable process for the use of a permeable membrane system, together with a PSA system, facilitating the production of high purity product at desirable product recovery levels, it will be appreciated that, for some gas separation operations, such high purity, high recovery operation may be desired with a different balance of compressor and other operating costs and resulting product recovery levels. The invention as described and claimed herein has a desirable processing flexibility enabling it to be modified to accommodate the needs and requirements of various practical operating circumstances, as will be evidenced from the discussion below with respect to various modifications of the embodiments illustrated in FIG. 1.

It will be noted above that the permeate gas from membrane system 4 was said to pass in line 6 to compressor means 7 to increase the pressure thereof, if desired, to an upper adsorption pressure level higher than the pressure level at which said permeate gas is withdrawn from separator means 4. From the above, it will be appreciated that such a circumstance can readily occur in embodiments in which it is desired to operate with a high pressure differential across the permeable membrane to enhance the separation efficiency of the membrane being used in a particular gas separation operation. When the desired recovery level in a particular separation operation permits, it is within the scope of the invention to operate the integrated membrane-PSA system without the use of said in-line, inter-stage compressor means 7. In such a processing variation, the permeate gas from membrane system 4 is diverted from line 6 to line 14, for passage directly to PSA system 9 without intermediate compression. The recycle of the countercurrent depressurization and/or purge step effluent from PSA system 9 for reintroduction to membrane system 4 serves to improve product recovery, but such recovery is not in general enhanced to the same extent as in the embodiment employing compressor means 7 as discussed above because the membrane will tend not to recover as much of the desired product in such modified, non-inter-stage compression operation. The reason for this effect will be seen to reside generally in the higher permeate gas pressures obtained in such modified FIG. 1 operation, with a consequent reduction of the driving force resulting across the permeable membrane. Thus, in the modified embodiment, permeate gas is typically withdrawn from membrane system 4 at a higher permeate gas pressure level than previously, with the permeate gas pressure being essentially the desired upper adsorption pressure level for the operation of PSA system 10. In this processing modification, the somewhat lesser product recovery obtainable will be seen to be compensated for by the accompanying elimination of said in-line, inter-stage compressor means 7 and the costs associated therewith. Those skilled in the art will appreciate that practical gas separation operations will pertain in which either one or the other of such FIG. 1 alternatives may be preferred, depending upon all of the pertinent factors pertaining thereto, including the separation to be achieved, the nature of the components being separated, the recovery and cost factors pertaining to such operation, the nature of the permeable membrane material and system to be employed, the particular PSA system desired, and the like.

In a further practical variation of the process of the invention as illustrated in FIG. 1, it will be seen that the first stage permeate gas from membrane system 4, after compression in compressor means 7 can be passed to optional second stage membrane system 15 for further separation therein prior to passage of the permeate from the initial membrane separation portion of the integrated membrane-PSA operation to the PSA system for final purification and advantageous recovery of high purity product. The non-permeate gas from said second stage membrane system 15 can be recycled as a feed gas to first stage membrane system 4. In this processing variation, it is convenient to carry out the initial gas separation using a very large pressure differential across membrane system 4, and a lesser pressure differential across membrane system 15, such that the permeate gas from said system 15 will be at the upper pressure level desired for use in PSA system 9. Operating in this manner avoids the necessity for employing a further in-line, inter-stage compressor means between said second stage membrane system 15 and PSA system 9. The convenience and the utility of permeable membranes can thus be effectively utilized in this processing variation by the addition of a second stage membrane for enhanced separation upstream of the PSA system. It should be noted that, in said FIG. 1 embodiments, it is within the scope of the invention to recycle all or at least a portion of the regeneration stream in line 11 to compressor means 12 for recycle in line 13 for combining with additional quantities of feed gas being passed to membrane system 4. In those embodiments in which only a portion of such regeneration stream, i.e., not essentially all thereof, is thus recycled in line 13, it is within the scope of the invention to pass a portion of said regeneration stream in line 11 from the system in line 16 to waste or to other use, and/or to pass a portion of said regeneration stream, after partial recompression in said compression means 12, back through line 17 to PSA system 9 as a feed or displacement gas at the adsorption pressure level therein or at an appropriate lower pressure level. Those skilled in the art will appreciate that the portions of said regeneration stream recycled in lines 13, 16 and/or 17 will vary from case-to-case depending upon the particular requirements and operating conditions pertaining to each gas separation operation. Typically, however, the portion of said regeneration stream recycled in line 13 for combination with the feed gas passing to the first stage membrane system 4 will be a significant portion of the overall regeneration stream. Those skilled in the art will also appreciate that at least a portion of the regeneration stream in other applicable embodiments of the invention, as in the FIG. 2 and FIG. 3 embodiments discussed below, is similarly recycled for combination with the first stage membrane system, but that a portion of said stream can similarly be withdrawn as a waste stream or can be recycled to the PSA system, as in the FIG. 1 embodiment. For convenience, such alternatives are not further disclosed or illustrated with reference to the FIG. 2 and FIG. 3 embodiments of the invention.

Figure 2:
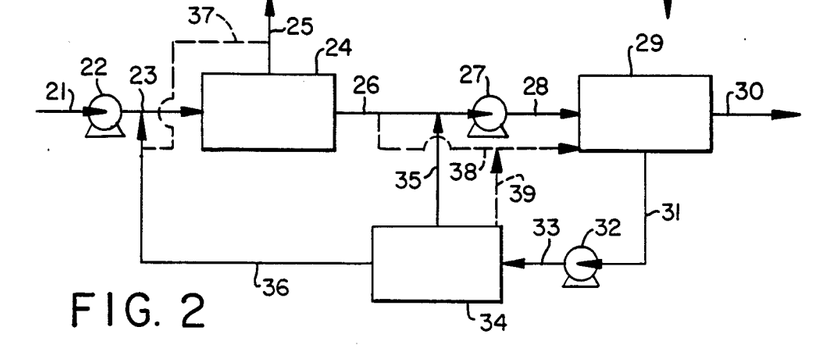
FIG. 2 is a schematic drawing of another embodiment of the invention wherein a PSA system for the recovery of high purity gas product is employed in combination with a two stage permeable membrane system.

FIG. 2 illustrates another embodiment of the invention in which a second stage membrane means is employed in the recycle line from the PSA system to the initial stage, bulk separation membrane system. In this embodiment, the feed gas stream in line 21 is initially compressed to the desired elevated pressure in compressor 22, if required, and is passed in line 23 to first stage membrane system 24, from which non-permeate gas is withdrawn through line 25 essentially at said elevated pressure level. Permeate gas at reduced pressure is withdrawn from system 24 in line 26 and is recompressed in an in-line, inter-stage compressor means 27 prior to passage in line 28 to PSA system 29, from which high purity product gas is withdrawn at the pertinent upper adsorption pressure level through line 30. The PSA waste stream, constituting countercurrent depressurization and/or purge gas effluent, is passed from said PSA system 29 through line 31 to additional compressor means 32 for repressurization, typically from the lower desorption pressure level of the PSA system to an appropriate pressure level being employed for the selective permeation portion of the overall operation. It is within the scope of the invention generally to recompress said recycle gas in line 31 to an elevated pressure greater or essentially the same as the pressure at which the feed gas stream is contacted with membrane stage 24. The recompressed recycle gas, constituting a regeneration stream, is then passed in line 33 to a second stage membrane system 34 capable of selectively permeating additional amounts of the first component present in the recycle stream in line 31. A second stage permeate gas is thus obtained at a reduced pressure level in said membrane stage 34, said reduced pressure being greater or essentially the same as the pressure at which permeate gas is withdrawn in line 26 from first stage membrane 24. The second stage permeate is recycled in line 35 for combining with such first stage permeate in line 26, or is otherwise recycled, depending on the pressure levels employed, for passage to an adsorbent bed in PSA system 29 for additional recovery of the first component as high purity product gas.

Second stage non-permeate gas, enriched in said second component of the gas mixture, is conveniently recycled in line 36 for combining with the additional quantities of the feed gas stream being passed at elevated pressure in line 23 to initial stage membrane 24 and/or is diverted through line 37 for combining with the non-permeate gas enriched in the second component removed from said membrane 24 through line 25 essentially at the applicable pressure on the non-permeate or feed side of the permeable membrane.

It should be noted that the FIG. 2 embodiment is also capable of adaptation with respect to various processing alternatives dependent on the requirements and/or limitations that might be applicable with respect to any given gas separation operation. Thus, as in the FIG. 1 embodiment, the permeate gas in line 26 may be diverted so as to pass through line 38 directly to PSA system 29, thus bypassing compressor means 27 in those applications in which the permeate gas present in line 26 is at the desired upper adsorption pressure level for PSA system 29 without the need for recompression in compressor means 27. In such a processing alternative, it will be appreciated that the permeate gas from second stage membrane 34 is conveniently recovered at a pressure level such that further recompression in compressor means 27 is unnecessary. In such cases, the permeate gas from second stage membrane is conveniently diverted from line 35 for passage in line 39 for combination with the first stage permeate gas in said line 38. The use of a second stage membrane for treatment of said PSA effluent recycle stream provides an additional practical means for increasing product recovery, again with processing variations involving desirable trade-offs of product recovery and of equipment and operating costs, enabling the invention to be optimized with respect to the various requirements pertaining to the overall gas separation operation for the production of high purity product.

Figure 3:
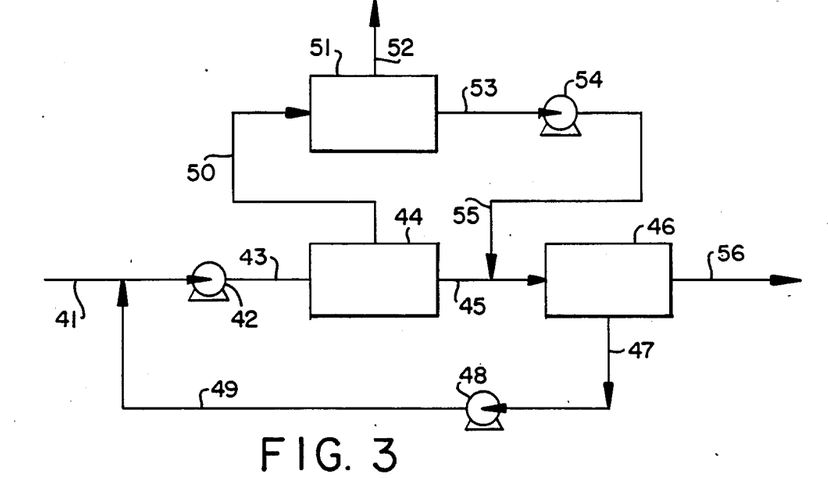
FIG. 3 is a schematic drawing of an embodiment of the gas separation process of the invention wherein another two stage membrane system is integrated with a PSA system from which high purity product gas is obtained at high recovery levels.

Another embodiment of the invention, illustrated in FIG. 3 of the drawings, incorporates an additional membrane stage for further gas separation, and recovery of desired product, from the non-permeate gas withdrawn from the first stage membrane referred to above. It will be appreciated that the second stage membrane as described with reference to this embodiment can be used apart from, or together with, the use of the PSA effluent recycle membrane stage described with reference to the FIG. 2 embodiments of the invention. In the FIG. 3 embodiment, a feed gas is passed in line 41 to compressor means 42, if required, and to line 43 for passage at elevated pressure to first stage membrane system 44 from which permeate gas is passed through line 45 to PSA system 46. While not illustrated, said permeate gas in line 45 may also be recompressed in an in-line, inter-stage compressor, if desired, depending upon the pressure levels employed for the membrane and PSA gas separation operations of a particular application. The countercurrent depressurization and/or purge effluent from said PSA system 46 is passed in line 47 to compressor means 48 for repressurization, typically from the lower desorption pressure of the PSA system, before being passed through line 49 for recycle to join with additional quantities of the feed gas stream being passed in line 41, through compressor 42, and in line 43 for contact with first stage membrane 44. The non-permeate gas is passed, essentially at said elevated pressure, from said first stage membrane 44 through line 50 to second stage membrane system 51, typically operated at a higher pressure differential than pertains with respect to first stage membrane 44. Non-permeate gas is removed, in turn, from said membrane 44 at elevated pressure through line 52, said non-permeate gas comprising the only necessary withdrawal of the less permeable, second component of the feed gas stream from the overall membrane-PSA system. The permeate gas from said membrane 51 is withdrawn through line 53 and is passed to compressor means 54 for recompression. The thus recompressed second stage permeate gas may be passed in line 55 to join with the permeate gas from first stage membrane 44 passing in line 45 to PSA system 46. It will be appreciated that, in embodiments in which a third stage membrane system is employed in the recycle line from the PSA system to the first stage membrane, it may be desirable to recycle said permeate gas passing from second stage membrane 51 in line 53 to said recycle line, conveniently after partial repressurization of the PSA recycle stream from its lower desorption pressure level, for further separation in said third stage, or recycle, membrane system. As in the other embodiments of the invention, the desired product gas is recovered from PSA system 46 as a high purity product, obtained at desirable product recovery levels through line 56. The FIG. 3 embodiment of the invention, and the associated processing alternatives, provide further operating flexibility, advantageously enabling desired gas separation operations to be adjusted in a manner compatible with the particular requirements, desires and limitations that may pertain to such operations.

The invention as described and claimed herein can be practiced, in its various embodiments, for the separation of a variety of feed gas streams encountered in practical commercial operations. From the discussion above, it will be appreciated that membrane only systems may be convenient and desirable for certain gas separations, particularly where a relatively high quality gas stream, such as a refinery off-gas or a plant purge effluent stream, is to be upgraded to a higher purity, i.e., up to the normal purity levels referred to above as having a purity generally in the range of about 95% to about 97 mol % for hydrogen or helium purification. Likewise, a PSA system alone may be advantageous for the purification of normal purity gases, or gases approaching such purity levels, to produce a high purity product. Furthermore, the membrane-PSA approach of the above-indicated Doshi patent is desirably employed for the production of high purity product gas from a feed stream available at high pressure, wherein the limitation on the obtainable product recovery level associated with the discharge of the countercurrent depressurization and/or purge effluent from the system can be tolerated. The invention provides a further significant improvement in the art, enabling the recovery of high purity product gas to be achieved at desirable recovery levels by means of a technically and economically feasible process, even where the feed gas stream comprises relatively impure material. Hydrogen-methane refinery off-gas mixtures are illustrative of the types of gas mixtures suitable for treatment in the practice of the invention. A 40 mol % hydrogen in such a hydrogen-methane or hydrogen-hydrocarbon (predominantly methane) mixture is an example of the relatively low purity gas mixtures that can be advantageously processed to produce high purity product at desirable recovery levels. Higher hydrogen concentrations up to, for example 90%, may also be encountered in the art. Helium-nitrogen off-gas mixtures represent another illustration as to the types of feed gas streams that can be used in the practice of the invention. For these and various other applications, e.g., air separation operations, such as where an enriched oxygen product stream is to be produced from air or a partially enriched oxygen-nitrogen feed gas stream, the invention represents an opportunity to combine the convenience of permeable membranes for bulk separation with the ability of PSA systems to readily produce high purity product, while avoiding undue loss of product from the overall system. As indicated above, the high purity product of the invention, for hydrogen or helium purification, will generally comprise product having a purity of from about 98% to about 99.9+ mol %, even up to 99.99+%, although the high purity product of the invention and normal purity product may have lower purity levels for other gas purification applications. Product recovery levels of about 90% to about 95% are readily achievable in the practice of the invention, with such product recovery levels constituting desirable recovery levels as contemplated herein. Those skilled in the art will appreciate that the first and second components of a feed gas mixture should not be construed as being limited to single gas components, such as to hydrogen alone as a first component or to nitrogen alone as the second component. To the contrary, it is possible to encounter practical commercial gas streams desired to be separated in which a variety of secondary components or impurities may also be present, and/or in which the product gas includes such components or impurities in desired or acceptable quantities, and in which the non permeate waste or secondary product stream withdrawn from one or more of the membranes in the system similarly comprises more than a single gas.

Feed gas streams suitable for use in the process of the invention may be available, as in off-gas streams, at a wide range of operating pressures. Thus, pressures of from about 100 to about 1,500 psig may be encountered, although pressures outside this range may also pertain in particular cases. In the illustrated embodiments of the invention, the feed gas stream is shown being compressed prior to passage to the initial membrane separation stage. If the feed gas is available at about 100–300 psig, it may be desirable to thus compress the gas to a higher pressure, e.g., to about 600 psig or more, for advantageous operation of the membrane system. In other instances, the feed gas stream may be at a higher pressure level than is needed or desired for the membrane separation operation, in which case the feed gas stream may actually be depressurized prior to passage to the initial membrane stage at the desired pressure level.

Permeable membrane systems suitable for use in the practice of the invention are available in the art. Such gas separation systems contain a gas permeable membrane capable of selectively permeating hydrogen or other desired product gas generally at relatively high pressures, e.g., pressures typically in excess of about 600 psig, commonly up to about 2,000 psig or higher. Inlet means are provided for passing a feed gas at the desired pressure to the feed inlet portion of the separator, with outlet means being provided for withdrawing desired product-rich permeate gas from the separator at a reduced pressure. Other outlet means are provided for separately withdrawing the non-permeate portion of the gas stream, i.e., the portion not passing through the membrane, from the separator essentially at the feed gas pressure. In commercially available embodiments, the permeable membrane is commonly in the form of either spiral wound or hollow fibers, made of cellulose acetate, cellulose triacetate, polysulfone material or any other suitable material, assembled within the separator structure. Such fibers may be assembled into compact bundles to provide a large membrane area available for the passage of the desired product gas therethrough. Using hollow fibers, the feed inlet portion of the separator and the non-permeate gas outlet means are conveniently in fluid communication within the separator on the outside of such hollow fibers. The permeate gas outlet means are then in fluid communication with the inside of the hollow fibers. In practical, convenient embodiments, the non-permeate gas outlet means and the permeate gas outlet means are at opposite ends of the separator, with the feed inlet means being positioned near the permeate gas outlet means. In operation, the pressurized feed gas enters the separator, and hydrogen or other desired product gas selectively permeates the hollow fiber walls. The product-rich permeate gas passes through the interior of the fiber bores at reduced pressure and is delivered to the outlet means at one end of the separator, while non-permeate gas passes to the outlet means typically positioned at the opposite end of the separator.

It is within the scope of the invention as set forth in the appended claims to employ the PSA system with at least one, and typically with at least two adsorbent beds, as may be desirable in particular applications. It will be appreciated that from three to about twelve or more adsorbent beds are commonly employed in conventional practice. In multi-bed systems, the cocurrent depressurization gas released from the product end of one bed may, if desired, be passed to more than one other bed in the system for pressure equalization purposes. Two or three such pressure equalization steps are commonly employed as each bed is depressurized from its upper adsorption pressure level ultimately to its lower desorption pressure. As noted above, cocurrent depressurization gas released from one bed can advantageously be used to provide purge gas to other beds, and such gas is commonly used both for pressure equalization and for purge purposes. It should be noted that, although the processing cycle as commonly pertains in multi-bed operation thus employs cocurrent depressurization as a part thereof, it is also within the contemplation of the invention to carry out the adsorption-desorption PSA sequence without any such cocurrent depressurization, in a single bed operation or in multi-bed operation. Those skilled in the art will appreciate that it is also within the scope of the invention to employ a so-called increasing pressure adsorption step in which product gas is recovered as the bed is being repressured from an intermediate pressure to the upper pressure level. This feature, disclosed in the McCombs patent, U.S. Pat. No. 3,738,087, is particularly applicable in air separation operations. Typically, the increasing pressure adsorption step is followed by cocurrent depressurization, without a constant pressure adsorption step as described above.

It is also common PSA practice, and within the contemplation of the invention, to adapt the PSA system for the passing of feed gas to at least two adsorbent beds in overlapping sequence at all stages of the processing cycle employed for the system. Likewise, while PSA adsorbent beds of equal size are commonly employed in multi-bed operations, it is also within the scope of the invention to employ a PSA system having large and smaller beds. Similarly, the permeable membrane separation units can be of different size, if desired, to obtain additional processing flexibility. As in conventional practice, any suitable adsorbent material, such as any suitable zeolitic molecular sieve material, e.g., those disclosed in the Wagner and Fuderer et al patents referred to above, may be used in the PSA system of the invention. Such material will be understood to be suitable if it is capable of selectively adsorbing impurities from a hydrogen or other desired product gas to be recovered at high purity levels.

From the description above, it will be appreciated that the operating pressures employed will vary for each particular application, depending on a variety of factors such as the feed gas stream to be separated, the purity and recovery levels desired, the permeable membrane material employed, the adsorbent employed in the PSA system, the particulars of the overall integrated system, the particular PSA cycle employed, the number of beds in the PSA system, the size and configuration of the membrane stages, and the like. In general, however, it is desirable to employ the PSA system at pressures below about 600 psig, because of the relative expense involved in higher pressure PSA operations. While such higher pressures can be employed in the PSA system, lower pressure levels are advantageous, particularly in the coordinating of the reduced pressure of the permeate gas from the membrane system with the upper adsorption pressure of the PSA system. Upper adsorption pressures on the order of from about 100 to about 500 psig, conveniently about 200 psig, are generally convenient and preferred for the purposes of the invention. Similarly, membrane separation systems are commonly operated at higher pressure levels in excess of about 600 psig, and up to 2,000 psig or higher. As indicated above, the pressure of a feed gas to any membrane system of the invention, and the reduced permeate pressure, and hence the pressure differential across the membrane stage, can be determined to provide a desired degree of gas separation therein. The pressure differential across the membrane stage, determined by the pressure of the feed gas and/or of the permeate gas, will be related to the degree of separation desired at that separation stage and the overall recovery level desired for the gas separation operation, typically the result of a balance of recovery and compression costs as indicated above. In the operation of individual membrane stages, the lower the purity of the feed gas passed thereto, the higher will be the pressure differential, i.e., the driving force, across the membrane to achieve any particular level of permeate gas purity therefrom.

In a representative comparative example illustrating the benefits of the invention, a refinery off-gas comprising 50% hydrogen and 50% methane is compressed to 800 psig and is passed to two integrated systems for hydrogen product gas recovery, one comprising two membranes in series with an in-line, inter-stage compressor, and the other with a PSA system employed in place of the second stage membrane. In the first system, the non permeate gas recovered at elevated pressure is recycled to combine with the compressed feed gas. In the other system, the countercurrent depressurization and/or purge gas effluent from the PSA system is recompressed from the lower desorption pressure level and is similarly combined with the compressed feed gas stream. In the two-stage membrane system, the hydrogen-rich permeate gas, containing 80% hydrogen, is obtained at 125 psig and is recompressed to 850 psig for passage to the second stage membrane, from which the permeate gas is recovered at 300 psig as normal purity hydrogen product gas, at 95% purity. The non-permeate gas is recycled at about 800 psig for combining with said compressed feed gas. In the membrane-PSA process of the invention, using the same membrane system as in the all-membrane embodiment and achieving approximately the same product recovery level, the permeate gas recovered at said 125 psig is recompressed to an upper adsorption pressure level of 310 psig. The product gas recovered from the PSA system comprises 99.0+% hydrogen, available, as in the all-membrane embodiment, at about 300 psig. Compression costs associated with the production of high purity hydrogen product were found to be somewhat higher than for the all-membrane embodiment. This reflects the compression of the PSA waste gas from about 10 psig to about 800 psig for recycle to join with the feed gas being passed to the initial membrane stage. As indicated above, the driving force across the membrane can be adjusted to achieve various degrees of initial bulk separation, using different levels of compression before membrane separation or resulting in different pressure levels for the permeate gas recovered. Such factors, together with the pressure levels employed in the PSA cycle, can be varied, from case-to-case, to optimize the recovery level and compression costs associated with the production of high purity product gas.

The invention will thus be seen to enable permeable membranes to be advantageously employed for bulk separation of gas streams, while achieving desired high purity product gas by the advantageous use of PSA technology and systems. In this highly useful integration, desired product recovery levels can be maintained, while the relationship of the product recovery to the compression and other costs associated with the gas separation operation can be balanced to reflect the needs and requirements pertaining any given operation.

I claim:

1. A process for the enhanced separation of gases comprising:
  (a) contacting a feed gas stream at an elevated pressure with a permeable membrane capable of selectively permeating a first component thereof, thereby obtaining a first component enriched, second component depleted permeate portion of said feed stream at a reduced pressure, and a second component enriched, first component depleted non-permeate portion of said feed stream essentially at said elevated pressure;
  (b) withdrawing said non-permeate gas from the permeable membrane;
  (c) passing said permeate gas to a feed end of an adsorbent bed in a pressure swing adsorption system capable of selectively adsorbing additional amounts of said second component therefrom at an upper adsorption pressure, with unadsorbed, purified first component gas being withdrawn as a high purity gas from a product end of the bed;
  (d) countercurrently depressurizing the bed to a lower desorption pressure and/or purging said bed to desorb and release a first and second component-containing regeneration stream from the feed end of the bed; and
  (e) recycling at least a first portion of said regeneration stream for combination with additional quantities of the feed gas stream, whereby the separation of the first component is achieved at a high purity and desirable recovery levels, with said second component being available at a desirably high pressure level.

2. The process of claim 1 in which essentially all of said regeneration stream is recompressed from its lower desorption pressure and is recycled for combination with additional quantities of said feed gas stream.

3. The process of claim 1 and including discharging a second portion of said regeneration stream from the overall process without use as a recycle stream therein.

4. The process of claim 1 and including recycling a portion of said regeneration stream to an adsorbent bed in said pressure swing adsorption system.

5. The process of claim 1 in which a portion of said regeneration stream is recompressed from its lower desorption pressure and is recycled for combination with additional quantities of said feed gas stream, while a second portion of said regeneration stream is discharged from the process, and a third portion thereof, after recompression to an appropriate level, is recycled back to an adsorbent bed in said pressure swing adsorption system.

6. The process of claim 1 in which said feed gas stream comprises a mixture of hydrogen as said first component and methane as said second component, said hydrogen being recovered at a purity of from about 98 mol % to about 99.0+ mol %.

7. The process of claim 1 in which said hydrogen purity is about 99.99+ mol %.

8. The process of claim 1 in which said permeate gas is passed to the feed end of said bed essentially at a reduced pressure level constituting the upper adsorption pressure for said pressure swing adsorption system.

9. The process of claim 1 in which said reduced pressure level of the permeate gas is less than the upper adsorption pressure level for said pressure swing adsorption system and including repressurizing said permeate gas from said reduced pressure level to said upper adsorption pressure level prior to passage with the permeate gas to said pressure swing adsorption system.

10. The process of claim 9 in which said feed gas stream comprises a mixture of hydrogen as said first component and methane as said second component.

11. The process of claim 10 in which the hydrogen content of said mixture is in the range of from about 40 mol % to about 90 mol %.

12. The process of claim 1 and including passing said portion of the regeneration stream being recycled for combination with feed gas to a second stage permeable membrane capable of selectively permeating residual amounts of said first component present in said regeneration stream, thereby obtaining a second stage permeate and non-permeate gas, and including combining said second stage permeate gas with the permeate from the permeable membrane contacted by said feed gas stream, constituting a first stage membrane, for passage to the feed end of said adsorbent bed, the second stage non-permeate gas, enriched in said second component, being recycled for said combining with the feed gas stream.

13. The process of claim 12 in which said combined first and second stage permeate gas is passed to the pressure swing adsorption system without in-line, interstage compression.

14. The process of claim 12 in which said combined first and second stage permeate gas is recompressed from a lower pressure to said upper adsorption pressure prior to passage to said pressure swing adsorption system.

15. The process of claim 12 and including passing the non-permeate gas from said first stage permeable membrane to a third stage membrane, capable of selectively permeating residual amounts of said first component present therein, withdrawing a non-permeate gas from said third stage permeable membrane, and recycling a third stage permeate gas for combining with the first and second stage permeate gas being passed to the feed end of the adsorbent bed for enhanced recovery of said first component.

16. The process of claim 15 and including recompressing said third stage permeate gas prior to the combining thereof with said first and second stage permeate gas.

17. The process of claim 16 and including recompressing the first, second and third stage permeate gas to the upper adsorption pressure level of the pressure swing adsorption system prior to passage of said permeate gas to said pressure swing adsorption system.

18. The process of claim 12 in which essentially all of said regeneration stream is recompressed from its lower desorption pressure and is recycled for combination with additional quantities of said feed gas stream.

19. The process of claim 12 and including discharging a portion of said regeneration stream from the overall process without use as a recycle stream therein.

20. The process of claim 12 and including recycling a portion of said regeneration stream to an adsorbent bed in said pressure swing adsorption system.

21. The process of claim 1 and including passing said non-permeate gas from said permeable membrane, constituting a first stage permeable membrane, to a second stage permeable membrane capable of selectively permeating residual amounts of said first component present therein thereby obtaining a second stage permeate gas and non-permeate gas, withdrawing the non-permeate gas from said second stage permeable membrane, and combining said second stage permeate gas with the permeate gas of step (c) being passed to the feed and of the adsorbent bed for enhanced recovery of said first component.

22. The process of claim 21 and including recompressing said second stage permeate gas prior to the combining thereof with the first stage permate gas.

23. The process of claim 21 in which essentially all of said regeneration stream is recompressed from its lower desorption pressure and is recycled for combination with additional quantities of said feed gas stream.

24. The process of claim 21 and including discharging a portion of said regeneration stream from the overall process without use as a recycle stream therein.

25. The process of claim 21 and including recycling a portion of said regeneration stream to an adsorbent bed in said pressure swing adsorption system.

26. The process of claim 1 and including releasing void space gas from said product end of the bed, thereby cocurrently depressurizing said bed from said upper adsorption pressure level prior to countercurrent depressurization thereof to said lower desorption pressure.

27. The process of claim 26 in which said released void space gas is employed for pressure equalization and/or purge purposes with other beds in said pressure swing adsorption system.

28. The process of claim 1 and passing said permeate gas of step (c) to a second stage permeable membrane capable of selectively permeating said first component thereby obtaining a second stage permeate gas, said second stage permeate gas being passed to said feed end of an adsorbent bed.

29. The process of claim 28 and including recompressing the permeate gas of step (c) prior to the passage thereof to said second stage permeable membrane.

30. The process of claim 29 and including recycling non-permeate gas from said second stage permeable membrane as feed gas to the initial permeable membrane.

* * * * *